United States Patent
Verswyvel et al.

(10) Patent No.: US 11,059,931 B2
(45) Date of Patent: Jul. 13, 2021

(54) PROCESS FOR THE PREPARATION OF STYRENIC POLYMERS HAVING AN IMPROVED COLOR STABILITY

(71) Applicant: INEOS STYROLUTION GROUP GMBH, Frankfurt am Main (DE)

(72) Inventors: Michiel Verswyvel, Mechelen (BE); Norbert Niessner, Friedelsheim (DE); Rainer Moors, Germersheim (DE); Konrad Knoll, Mannheim (DE); Bart Van-Den-Bossche, Bornem (BE); Christof Camerlinck, Sleidinge (BE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 0 days.

(21) Appl. No.: 16/640,901

(22) PCT Filed: Aug. 29, 2018

(86) PCT No.: PCT/EP2018/073181
§ 371 (c)(1),
(2) Date: Feb. 21, 2020

(87) PCT Pub. No.: WO2019/043030
PCT Pub. Date: Mar. 7, 2019

(65) Prior Publication Data
US 2020/0190243 A1  Jun. 18, 2020

(30) Foreign Application Priority Data
Aug. 31, 2017  (EP) .................................... 17188827

(51) Int. Cl.
| | |
|---|---|
| *C08F 297/04* | (2006.01) |
| *B01J 4/00* | (2006.01) |
| *B01J 19/00* | (2006.01) |
| *B01J 19/18* | (2006.01) |
| *C08F 2/01* | (2006.01) |
| *C08F 2/08* | (2006.01) |
| *C08F 2/42* | (2006.01) |
| *C08F 6/06* | (2006.01) |
| *C08F 112/08* | (2006.01) |

(52) U.S. Cl.
CPC .......... *C08F 297/044* (2013.01); *B01J 4/001* (2013.01); *B01J 19/0053* (2013.01); *B01J 19/1812* (2013.01); *C08F 2/01* (2013.01); *C08F 2/08* (2013.01); *C08F 2/42* (2013.01); *C08F 6/06* (2013.01); *C08F 112/08* (2013.01); *B01J 2219/00029* (2013.01); *B01J 2219/00164* (2013.01)

(58) Field of Classification Search
USPC .................................................. 528/490, 499
See application file for complete search history.

(56) References Cited

U.S. PATENT DOCUMENTS

| | | | |
|---|---|---|---|
| 3,801,520 | A | 4/1974 | Hogan et al. |
| 5,635,561 | A * | 6/1997 | Nicol .................. C08F 297/044 525/98 |
| 6,593,430 | B1 | 7/2003 | Knoll et al. |
| 2004/0014915 | A1 | 1/2004 | Knoll et al. |
| 2010/0016530 | A1 | 1/2010 | Lin et al. |

FOREIGN PATENT DOCUMENTS

| | | |
|---|---|---|
| DE | 10306891 A1 | 8/2004 |
| DE | 102004011345 A1 | 9/2005 |
| JP | S63264602 A | 11/1988 |
| JP | 2002060414 A | 2/2002 |
| JP | 2003026723 A | 1/2003 |

OTHER PUBLICATIONS

Machine translation of Detailed Description of DE 10306891 A1; retrieved from ESPACENET on Mar. 22, 2021. (Year: 2004).*

* cited by examiner

Primary Examiner — Fred M Teskin
(74) Attorney, Agent, or Firm — J.A. Lindeman & Co. PLLC

(57) ABSTRACT

Process for the preparation of styrenic polymers having an improved color stability by anionic polymerization wherein the obtained terminated polymer solution is fed to a dispersing device to which water is added, fed to a buffer vessel and then is impregnated in a static mixer by addition of further water, carbon dioxide and one or more stabilizers.

13 Claims, No Drawings

PROCESS FOR THE PREPARATION OF STYRENIC POLYMERS HAVING AN IMPROVED COLOR STABILITY

The present invention relates to a process for the preparation of styrenic polymers which have an improved color stability, in particular linear or branched styrene-butadiene block copolymers (SBC), (co)polymers obtained by said process, blends comprising said (co)polymers and their use.

During the work up of SBC block copolymer solutions obtained by lithium organoalkyl initiated anionic polymerization—after termination of the polymerization with terminating agents—usually water and carbon dioxide are added for the hydrolysis of the resulting lithium alkoxide. The work-up of this polymer solution, i.e. addition of stabilizers and plasticizer and subsequent solvent removal, often yields a discolored polymer matrix (yellow). Therefore, the work-up of these lithium alkoxides requires specific procedures.

In addition, as a consequence of the agglomeration of lithium salts formed during the hydrolysis (mainly $Li_2CO_3$ and $LiHCO_3$) to particles with dimensions in the area of the wavelength of the visible light (>350 nm) scattering will show up and the material will lose (partly) its transparency and gain haze, specifically when significant amounts of a lithium initiator are used.

U.S. Pat. No. 3,801,520 deals with a carbon dioxide and water treatment of a coupled lithium compound initiated polymer, in particular of branched SBC block copolymers, wherein $CO_2$ and water are added prior to contact with phenolic stabilizers and preferably before contact with any stabilizer in order to reduce strongly the discoloration. $CO_2$ and $H_2O$ are added to the polymer solution after addition of the coupling agent and the obtained mixture is subsequently sufficiently agitated to emulsify the carbonized water over the polymer solution. The carbon dioxide and water can be added together or separately at the same time or successively. Preferably the water is added first with sufficient agitation. The obtained polymers have a lighter color but the color stability is still in need of improvement.

JP-A 2002-060414 discloses a method for stabilizing a polymer by neutralizing catalyst residues contained in a polymer solution obtained by polymerizing a vinylaromatic hydrocarbon and a conjugated diene in the presence of an organolithium initiator.

The living polymer chains contained in the polymer solution are deactivated by water or alcohol and then a carbon dioxide gas is directly blown into the polymer solution continuously by use of a pipe or a mixing tank.

In order to prevent the formation of wall deposits of insoluble Li salts such as Li isopropoxide and Li hydroxide, US 2004/0014915 discloses a process for the preparation of linear homo- or block-copolymers of styrene by anionic polymerization of styrene and optionally butadiene in the presence of organolithium initiators and subsequent termination of the "living" polymer chains with an n-alkyl glycidyl ether, a dialkylketone or isopropanol. To the obtained polymer solution, $CO_2$ (in particular as dry ice) and water are added with subsequent shaking. The final polymer solution is colorless, but—in case of isopropanol—very cloudy.

DE-A 10 2004 011 345 discloses a process for working up polymer solutions of anionically polymerized linear styrene-butadiene-block copolymers, in the presence of organolithium initiators, wherein the polymers are deactivated with a coupling or chain stopper agent, in particular alcohols such as isopropanol, and then the whole work-up of the obtained polymer solution is carried out in a carbonate medium. The formed Li alcoholate comprised in the polymer solution is acidified and hydrolyzed by use of premixed (gaseous) $CO_2$ and water. The manner of addition is not described in detail. The obtained polymers contain significantly lower specks and lower yellowness.

It is one object of the present invention to provide an improved process for the anionic (co)polymerization of vinyl aromatic monomers and, if desired conjugated dienes, in the presence of organometal initiator(s) which results in homopolymers or block copolymers having an improved color stability (low yellowness index). It is a further object of the invention to provide a continuous impregnation process for the preparation of said polymers.

One aspect of the invention is a process for the preparation of homo- or block-copolymers of vinyl aromatic monomers by anionic polymerization comprising the following steps:
  (i) polymerization of at least one vinyl aromatic monomer and optionally at least one conjugated diene in an inert non-polar solvent in the presence of an organometal initiator, in particular organolithium initiator, in a reactor, preferably a batch reactor, and subsequent deactivation of the obtained "living" polymer chains with a terminating agent to obtain a polymer solution;
  (ii) feeding the polymer solution obtained in step (i) to a dispersing device to which water is added in a continuous or in a discontinuous mode;
  (iii) feeding the polymer solution obtained in step (ii) to a buffer vessel;
  (iv) feeding the continuously withdrawn polymer solution from the buffer vessel of step (iii) into a static mixer for impregnation by addition, preferably by injection, of further water, carbon dioxide and one or more stabilizers;
  wherein subsequent to step (iii), the process is conducted in a continuous mode;
  in step (ii):
    the dispersion device is a filter, preferably a bagfilter, having a mesh size of 200 to 1500 µm, a static mixer or a process flow part, in which the characteristic length of the process flow part, the velocity, the density and the dynamic viscosity of the polymer solution are chosen in such a way that a transitional or turbulent flow characterized by a Reynolds number above 2300 occurs;
    the flow rate of the polymer solution is 10 to 500 $m^3$/h at a temperature of from 50 to 130° C.; and
    the water is added in amounts of 0.01 to 0.50 $l/m^3$ polymer solution, preferably 0.05 to 0.20 $l/m^3$ polymer solution;
  in step (iv):
    the flow rate of the water is more than 0.05 $l/m^3$ polymer solution, preferably more than 0.10 $l/m^3$ polymer solution, and
    the flow rate of the carbon dioxide is more than 5 $l/m^3$ polymer solution, preferred 10 to 20 $l/m^3$ polymer solution, more preferred 14.5 to 17.5 $l/m^3$ polymer solution; and
  in steps (ii) and (iv), the pH of the water is in the range of from 5 to 7, preferably 6.2 to 6.6.

In the context of the invention the term "polymer solution" refers to a solution comprising the afore-mentioned polymers solved in an inert non-polar solvent to which in steps (ii) and (iv) water is added. In this context the term "solution" includes—depending on the amount of water added (in steps (ii) and (iv))—a dispersion of very fine particles of water in said solvent when above the solubility threshold of water in said solvent, or a homogenous mixture of water in said solvent when below the solubility threshold of water in said solvent.

"Living" polymer chains means the growing polymer chains formed during the anionic polymerization. In the context of the invention the term "dispersing" means to distribute or to spread over a wide area. In the context of the invention the "Reynolds Number" characterizing a flow is defined as follows:

$$Re=(\rho u^2)/(\mu u/L)=\rho uL/\mu \text{ where:}$$

Re=Reynolds Number (non-dimensional)
$\rho$=density (kg/m$^3$, lb$_m$/ft$^3$)
u=velocity based on the actual cross section area of the process flow part (m/s, ft/s)
$\mu$=dynamic viscosity (Ns/m$^2$, lb$_m$/s ft)
L=characteristic length (m, ft).

For a tube or pipe the characteristic length is the hydraulic diameter ($d_h$=hydraulic diameter (m, ft)), d.h. L=$d_h$.

The term "process flow part" means common process flow parts suitable for a transitional or turbulent flow characterized by a Reynolds number above 2300. Such a flow can occur in vessels, between plates, any kind of tubes or pipes (square tubes, circular tubes etc.). Preferably the process flow part is a tube or pipe, more preferably a circular tube or pipe.

The dynamic viscosity is determined according to DIN EN ISO 3104:1999-12 at a temperature of from 60 to 80° C.

A "transitional or turbulent flow" is defined as a flow characterized by a Reynolds number of Re>2300.

Preferably a filter is used as dispersing device in step (ii) of the inventive process which allows that during the addition of water the polymer solution is only gently moved, so that very fine particles of water are formed and a heavy dispersion of water in the polymer matrix is prevented. It was surprisingly found that this particular addition of water in step ii), use of a buffer vessel in step iii) and impregnation of the polymer solution by addition (injection) of water, carbon dioxide and stabilizer in step iv) according to the inventive process improves the color stability of homo- or block copolymers of vinyl aromatic monomers prepared by said process.

The use of a buffer vessel in step (iii) allows running of the impregnation step (iv) in a continuous mode by feeding a constant polymer solution stream. Preferably in step (i) a discontinuous batch reactor is used for feeding the buffer vessel. Absence of said buffer vessel would require running of the impregnation step (iv) also in a discontinuous way. A continuous impregnation is more preferred as a stable run rate can be obtained and consequently, more exact concentrations of the added components. A repeated restart of the impregnation step (iv) during each hold-up of the reaction would sacrifice on accuracy.

In addition, the use of a second buffer vessel in optional step (v) after the impregnation step (iv) ensures the continuous mode of the impregnation process in case failures in the solvent removal and subsequent pelletization process would occur and need to be idled for a (short) time interval.

In order to solve the above problem to provide polymers having an improved color stability, it was surprisingly found that—in case that a batch reactor is used in step (i) and the impregnation step (iv) according to the invention is run in a continuous mode—it is important to add water between the batch reactor and the buffer vessel. The hold-up of the polymer solution in the buffer vessel without any water added would induce color instability. It will take too long before the polymer solution passes through the impregnation and hence unwanted side-reactions can start to occur at this location.

A further advantage of adding water on the filter used in step (ii) is that—in the preferred case that the filter is a bag filter—the frequency of filter bag changes/replacements is reduced, which thus reduces down time, maintenance cost and personnel costs of the entire process.

The polymers which can be obtained by the inventive process are homo- or (block) copolymers made from at least one vinyl aromatic monomer which in step (i) of the inventive process are polymerized by a conventional organometal initiator, preferably an organolithium initiator, and thereafter treated with a terminating agent to give a linear or star shaped polymer (terminating agent=coupling agent). Preferably the polymers are block copolymers made from at least one vinyl aromatic monomer, in particular styrene or functionalized styrene derivatives, and at least one conjugated diene, in particular 1,3-butadiene or isoprene.

The anionic polymerization of vinyl aromatic monomers, in particular styrene or functionalized styrene derivatives, and the copolymerization of vinyl aromatic monomers and conjugated dienes, in particular butadiene or isoprene, to produce block copolymers are well known. Block copolymers consist of a plurality of polymer blocks, e.g. polystyrene, polybutadiene and butadiene/styrene copolymer blocks. The latter can be random copolymer blocks or e.g. tapered copolymer blocks, where initially a polybutadiene sequence forms into which more and more styrene is incorporated as the polymerization progresses, so that eventually a polystyrene sequence is formed. In each case, a metal ion, in particular a lithium ion, is present at the chain end which must be terminated.

The anionic polymerization according to step (i) of the inventive process is generally carried out in inert non-polar organic solvents such as aliphatic or cycloaliphatic hydrocarbons, preferably cyclohexane. Initiators to initiate the anionic polymerization are conventional organometal compounds, preferably organolithium compounds, in particular alkyl lithium compounds, more preferably n-butyllithium and/or sec-butyllithium.

The reactor used in step (i) can be a reactor suitable for continuous or batch processes, preferably the reactor is a batch reactor. The batch reactor can be a usual tank reactor commonly used for anionic polymerizations. Preferably the batch reactor is a stirred tank reactor provided with a stirring device. The size or volume of the batch reactor is not critical. Often a batch reactor is used having a volume between 15 to 80 m$^3$.

Preferred polymers are copolymers of a conjugated diene, preferably butadiene or isoprene, and a vinyl substituted aromatic compound, preferably styrene or functionalized styrene derivatives, synthesized by sequential monomer addition according to the aimed block-structure. The content based on vinyl aromatic monomers is generally 50 to 100 wt.-%, preferably 60 to 90 wt.-%, based on the total block copolymer.

In addition, conventional polymerization auxiliaries, e.g. monomer randomizers like ethers and potassium alkoxides, can be added during the polymerization.

At the end of the polymerization, monitored by the end of the temperature increase of the polymerization mixture after the addition of the last monomers, a terminating agent is added. The latter could be an alcohol, preferably isopropanol, to yield linear polymers or a coupling agent to yield macromolecules where two or more polymer chains are joined together. A coupling agent is typically a polyfunctional compound having at least three reactive sites such as an epoxydized unsaturated plant oil, preferable epoxydized soybean oil or epoxydized linseed oil. But also other coupling agents, e.g. tetra-alkoxysilanes, are possible. The final polymer content generally is 10 to 40 wt.-%, preferably 20 to 35 wt.-%. After the addition of said terminating agent, alcoholate groups e.g. —OLi will be formed on the alcohols and/or coupling agents.

The preparation of asymmetrical linear and star-shaped block copolymers with at least two external styrene hard blocks of different block length is described in U.S. Pat. No. 6,593,430 which disclosure of the polymerization and termination step is referenced hereby.

According to step (ii) of the inventive process the polymer solution obtained in step (i) is fed to a dispersion device to which water is added in a continuous or in a discontinuous mode.

In case a batch reactor is used in step (i), in step (ii) the water can be added in a discontinuous mode, e.g. in between consecutive discharges of the batch reactor, or in a continuous mode during discharge of the reactor.

In case a continuous reactor is used in step (i), in step (ii) the water can be added in a continuous mode e.g. by using by a bagfilter with mesh size 200 to 1500 µm, a static mixer or a process flow part suitable for a transitional or turbulent flow characterized by a Reynolds number above 2300.

The dimensions of the process flow part, the flow rate and the viscosity of the polymer solution are chosen in such a way that a transitional or turbulent flow characterized by a Reynolds number above 2300 occurs.

The process flow part suitable for a transitional or turbulent flow—characterized by a Reynolds number above 2300—can have a characteristic length (diameter) of from 0.05 to 1.0 m, preferably of from 0.1 to 0.5 m, and the polymer solution being transferred therein can have a velocity (=flow rate/cross section area of process flow part) of from 1.0 to 10.0 m/s, preferably of from 1.5 to 5 m/s, densities of from 750 to 900 kg/m$^3$, preferably of from 750 to 800 kg/m$^3$, and the dynamic viscosity can be of from 0.01 to 10 Ns/m$^2$ at a temperature of from 60 to 80° C., preferably of from 0.05 to 5 Ns/m$^2$ at a temperature of from 60 to 80° C.

The pH of the water used in steps (ii) and (iv) is in the range of from 5 to 7, preferably 6.2 to 6.6. Preferably demineralized water is used. Water can be acidified to give water of said pH-range. For the acidification common acids such as carbonic acid can be used.

The dispersing device can be a filter—having a mesh size of 200 to 1500 µm—or a static mixer. Suitable static mixers are preferably such as described in step (iv). Preferably the dispersing device is a filter. Preferred are filters having a mesh size of 500 to 1000 µm, in particular 700 to 900 µm. The inner diameter of the filter is not critical; often filters are used having an inner diameter of from 50 to 100 cm.

Preferably the filter is a bag filter comprising a housing and one or more filter bags, each having a mesh size of 200 to 1500 µm, preferably 500 to 1000 µm, more preferred 700 to 900 µm. The inner diameter of the housing of the bag filter is not critical; often the inner diameter of the housing is 50 to 100 cm, in particular 65 to 85 cm. The housing of the bag filter usually is—at least mainly—made from stainless steel.

Suitable bag filters which can be used in step (ii) are commercially available as MAXILINE® MBF from Hayward Filtertechnik GmbH & Co. KG, Germany. These bag filters are available in four sizes for 3, 4, 6, 8 or 12 filter bags of a standard size (diameter: 168 mm, height: 660 mm), bag filters with 8 filter bags are preferred. A particular preferred bag filter is of the type MBF-0802-AB16-150DS-11GEN-M.

When leaving the reactor, preferably when leaving or emptying the batch reactor, the temperature of the polymer solution is generally between 50 to 130° C., preferably 60 to 90° C.

Preferably steps (i) to (iii) are run in a discontinuous mode.

The flow rate—when leaving the reactor, preferably when leaving or emptying the batch reactor—of the polymer solution in step (ii) is generally in the range of from 10 to 500 m$^3$/h, preferably 50 to 300 m$^3$/h, preferably 100 to 190 m$^3$/h. Said flow rate can be achieved with one or more pumps between the reactor and the dispersing device.

The flow rate of the polymer solution over the filter area, in particular over the bag filter area, depends on many factors such as the mesh size of the filter or the mesh size of the filter bags, the inner diameter of the filter (or the housing) and the temperature of the polymer solution and is often in the range between 0.005 m$^3$/s and 0.050 m$^3$/s, preferably between 0.010 m$^3$/s and 0.025 m$^3$/s.

The water added in step (ii) is added in amounts of 0.01 to 0.5 l/m$^3$ polymer solution, preferably 0.05 to 0.2 l/m$^3$ polymer solution.

In step (iii) of the process according to the invention the polymer solution is fed to a buffer vessel (=first buffer vessel). The size and type of the buffer vessel is not critical. Any buffer vessel known in the art for these purpose can be used. Often a buffer vessel is used having a volume between 75 to 125 m$^3$.

Subsequent to step (iii) of the process according to the invention, the process is conducted in a continuous mode.

In an optional step—prior to step (iv)—the polymer solution continuously withdrawn from the buffer vessel can be filtered by an additional filter. Suitable filters which can be used are cartridge filters with a mesh size between 50 µm and 300 µm, more preferred a mesh size between 100 µm and 150 µm. Suitable cartridge filters which can be used prior to step (iv) are commercially available as G78W84HCB from CUNO MICRO-KLEAN. The filter material is consisting of acryl fiber and phenol resin and has a length of 100 cm. Such an additional filter allows holding finer particles, not captured by the filter between the reactor and the first buffer vessel, which are formed during the reaction and during hold-up in the buffer vessel in process step (iii). Examples of such particles are lithium salts or crosslinked polymers (gels).

In step (iv) of the process according to the invention, which is subsequent to step (iii) or subsequent to the afore-mentioned optional filtering step after step (iii), the polymer solution is continuously withdrawn from the buffer vessel of step (iii) into a static mixer for impregnation by addition—in particular injection—of further water, carbon dioxide and stabilizers, and optionally processing aids and/or further additives.

In step (iv) the temperature of the polymer solution is generally between 40 to 100° C., preferably 60 to 90° C., more preferably 70 to 80° C. The flow rate of the polymer solution is not critical and is often from 9 to 15 m$^3$/h. The flow rate of the water generally is more than 0.05 l/m$^3$ polymer solution, preferably more than 0.10 l/m$^3$ polymer solution. The flow rate of the water is often in the range of from 0.05 to 0.5 l/m$^3$ polymer solution.

The flow rate of the carbon dioxide generally is more than 5 l/m$^3$ polymer solution, preferred 10 to 20 l/m$^3$ polymer solution, more preferred 14.5 to 17.5 l/m$^3$ polymer solution.

The pressure of the carbon dioxide (in the feeding tube) during addition, in particular during injection, is generally between 12 and 25 bar, preferably between 15 and 22 bar.

The one or more stabilizers are added, in particular injected, as a solution. Suitable solvents to dissolve the solid stabilizers are nonpolar solvents such as hexane, cyclohexane etc. The concentration of each of the one or more stabilizers in the solvent generally is in the range of from 3.5 to 15 wt.-%, preferably 5 to 12 wt.-%.

The flow rate of the stabilizer solution is preferably 1 to 8 $l/m^3$ polymer solution, in particular 3.5 to 4.5 $l/m^3$ polymer solution.

Preferred stabilizers are oxygen radical scavengers such as Irganox® 1010 (BASF, Germany), Songnox® 1010, Irganox® 1076, Irganox® 565 and blends thereof, carbon radical scavengers such as Sumilizer® GS, Sumilizer® GM and blends thereof, and/or secondary stabilizers such as Irgafos® 168 (BASF, Germany). Said stabilizers are commercially available.

Preferably the afore-mentioned components added in step (iv) are added by injection, preferably via injection tubes in the process line.

Preferably as a static mixer used in step (iv) and/or in step (ii) a Sulzer mixer comprising at least two mixing elements commercially available from Sulzer company, Switzerland, is used, in particular a Sulzer mixer of the type SMX® with SMX mixing elements.

In order to obtain homogeneous mixing over the entire pipe cross section, the elements are preferably arranged so that they are offset 90° to each other.

Preferably a Sulzer mixer with 2 or 3 SMX mixing elements is used. Each mixing element has advantageously a length of from 700 to 1000 mm. The nominal tube diameter of the static mixer is usually between DN50 to DN100, preferred is DN80.

According to one preferred embodiment before entering the first SMX mixing element, water, carbon dioxide and at least one stabilizer, preferably all stabilizers, are added—in particular injected—to the polymer solution, then before entering the second SMX mixing element optionally further (often a secondary) stabilizer and optionally processing aids and/or further additives are added.

According to a further preferred embodiment before entering the first SMX mixing element, water is added—in particular injected—to the polymer solution, then before entering the second SMX mixing element carbon dioxide is added, and at last before entering the third SMX mixing element all stabilizers and optionally processing aids and/or further additives are added.

According to a further preferred embodiment before entering the first SMX mixing element, water and $CO_2$ are added—in particular injected—to the polymer solution, then before entering the second SMX mixing element at least one stabilizer is added, and at last before entering the third SMX mixing element all stabilizers and optionally processing aids and/or further additives are added.

According to a further preferred embodiment before entering the first SMX mixing element, water is added—in particular injected—to the polymer solution, then before entering the second SMX mixing element carbon dioxide and at least one stabilizer are added, and at last before entering the third SMX mixing element optionally further stabilizers and optionally processing aids and/or further additives are added.

According to a further preferred embodiment before entering the first SMX mixing element, water and $CO_2$ are added—in particular injected—to the polymer solution, then before entering the second SMX mixing element all stabilizers and optionally processing aids and/or further additives are added.

According to a further preferred embodiment before entering the first SMX mixing element, water is added—in particular injected—to the polymer solution, then before entering the second SMX mixing element $CO_2$, all stabilizers and optionally processing aids and/or further additives are added.

In the afore-mentioned embodiments, the addition of a processing aid, in particular of a plasticizer (e.g. mineral oil), is preferred.

Furthermore preferred as static mixer used in step (iv) and/or in step (ii) is a Kenics® static mixer, preferably a static mixer of type 10 KMS 12 (from Chemineer, Inc.). This static mixer is a one unit mixer with 3 sections, preferably 4 ports, and a total of 12 elements (preferably 4 elements following each component injection nozzle).

According to one preferred embodiment before entering the first section of said static mixer, water is added—in particular injected—to the polymer solution, then before entering the second section carbon dioxide is added, and at last before entering the third section—preferably through different ports at the same position—all stabilizers and optionally processing aids and/or further additives are added, The ratio of water (=total amount of water added in steps (ii) and (iv)) to carbon dioxide ($H_2O/CO_2$) is preferably on an equal molar basis, but can also vary from 0.5 to 10 mols of water per mol of $CO_2$.

Preferably the carbon dioxide and water (=total amount of water added in steps (ii) and (iv)) are added in approximately the theoretical stoichiometric amount necessary to react with the metal ions, in particular the lithium ions, present in the polymer solution. In case of lithium salts, the salt crystals of $Li_2CO_3$ are smaller compared to $LiHCO_3$ and are causing therefore less haze.

Preferably in step (i) an organolithium compound is used so that lithium ions are present in the polymer solution, but the following ratios are also valid for other metal ions (($M^+$), e.g. alkali metal ions).

The molar ratio of lithium ($Li^+$) to water ($H_2O$) can be 1:10, preferably 1:5, more preferably 1:3, most preferably 1:1.5, and in particular 1:1. The molar ratio of lithium ($Li^+$) to $CO_2$ can be 2:10, preferably 2:5, more preferably 2:3, most preferably 1:0.5. Preferably stoichiometric amounts of carbon dioxide and water (=total amount of water added in steps (ii) and (iv)) based on the lithium ($Li^+$) are used.

In step (iv) optionally further additives and/or processing aids can be added to the polymer solution. Suitable additives and/or processing aids are in particular antiblocking agents, dyes, fillers, UV absorbers and plasticizers. Preferred is the use of a plasticizer. Suitable plasticizers are homogeneously miscible oil or oil mixture, preferably mineral oil (or white oil) or dioctyl adipate, in particular mineral oil. If present, the injection flow of the plasticizer, in particular mineral oil, is preferably 0.1 to 30 $l/m^3$ polymer solution, in particular 0.5 to 15 $l/m^3$ polymer solution.

In an optional step (V) subsequent to step (iv) of the process according to the invention the polymer solution obtained in step (iv) can be fed to a further buffer vessel (=second buffer vessel). The description for the first buffer vessel above is also valid for the second buffer vessel. This further buffer vessel allows maintaining a continuous process in the impregnation section (step iv) in case of problems during the optional blending and hydrogenation steps and solvent removal and pelletization process.

Subsequent to step (iv) or subsequent to the afore-mentioned optional step with a second buffer vessel, the polymer solution obtained by the process according to the invention can be worked up in a usual manner.

Optionally, prior to working up, said polymer solution can be mixed with one or more other compatible thermoplastic polymers (preferably as solution) and/or further additives. Furthermore, prior to working up, optionally said polymer solution can be hydrogenated according to known methods.

By use of one or more of said optional procedures—prior to working up—a polymer solution comprising a polymer mixture and/or modified (e.g. hydrogenated) polymers is obtained.

For working up of said polymer solution (optionally mixed and/or modified as hereinbefore described), the polymer solution can be degassed in order to remove the solvent.

The removal of the solvent can be achieved by common methods such as flash devolatilization and/or devolatization under reduced pressure. For the latter purpose advantageously a degassing device and/or an extruder, preferably a twin-screw extruder, can be used. Preferably, first a degassing device (devolatizer) and then an degassing extruder are used. During the extrusion further additives and/or processing aids can be added.

In an optional—preferred—step subsequent to the degassing (solvent removal) step, the obtained polymer—in particular the obtained extrudate—can be granulated or pelletized by commonly known methods.

Preferred is a process according to the invention which subsequent to step (iv) further comprises feeding of the polymer solution to a second buffer vessel.

Furthermore preferred is a process according to the invention which further comprises—subsequent to step (iv) or subsequent to feeding of the polymer solution to a second buffer vessel—degassing of the polymer solution. Furthermore preferred is the afore-mentioned process which subsequent to the degassing step additionally comprises granulation or pelletizing of the obtained polymer.

A further subject of the invention are homo- or block copolymers of vinyl aromatic monomers, such as styrene, in particular linear or branched block-copolymers (SBC) comprising polymerized units of at least one vinyl aromatic monomer and at least one conjugated diene, such as butadiene, obtained by the process according to the invention. Suitable polymers and block copolymers are such as hereinbefore described.

One further subject of the invention is a polymer blend having an improved color stability comprising at least one homo- or block copolymer obtained by the inventive process. Suitable polymers for such a polymer blend are other transparent thermoplastic polymers which are compatible with the homo- or block copolymers obtained according to the inventive process such as other styrene-butadiene block-copolymers (SBC), polystyrene (PS), styrene-methylmethacrylate (SMMA). Polymer blends comprising (or consisting of) at least one SBC obtained by the inventive process and at least one styrene/methyl methacrylate-copolymer (SMMA) are preferred. Said polymer blends can be obtained by conventional methods such as melt mixing of the polymer molding by aid of common devices (e.g. a single or twin screw extruder or a kneading machine).

One further subject of the invention are shaped articles—in particular such as plastic household articles, such as bowls, bottles, jars, carafes, etc. —comprising the homo- or block copolymers obtained by the inventive process or their blends as hereinbefore described. Said shaped articles can be produced by conventional methods (extrusion, injection molding etc.) known in the art and have a high transparency, high glass-like brilliance, high impact resistance and high color stability.

The invention is further illustrated by the examples and claims.

EXAMPLES

All solvents and monomers used in the following examples were dried prior to use over aluminum-oxide columns or using a distillation process. Unless otherwise stated, the water used in all process steps was demineralized water (pH 6.4).

Example 1 Polymerization of a Star Shaped SBC-Block Copolymer (=Step (i) of the Process According to the Invention)

A star-shaped styrene-butadiene block copolymers of the structure

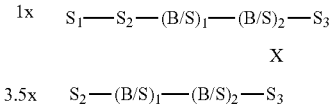

$$X$$

$$3.5x \quad S_2-(B/S)_1-(B/S)_2-S_3$$

wherein, $S_1$, $S_2$ and $S_3$ denote different styrene polymer blocks, $(B/S)_1$ and $(B/S)_2$ are different random styrene/butadiene copolymer blocks and X denotes the coupling center derived from the coupling agent, was prepared by sequential anionic polymerization of styrene (monomers S1 to S5) and butadiene (monomers B1 and B2), and subsequent coupling using epoxidized soybean oil.

In a batch reactor (stainless steel reactor, stirred, 50 m³) 21600 l of cyclohexane at 40° C. was used as initial charge (ic) and 2803 l styrene (S1) was added at 20 m³/h. When 280 l of S1 had been dosed, 32.19 l of a 1.4 M sec-butyllithium solution (BuLi 1) for initiation (Ini1) had been dosed at once. The reaction was allowed to proceed under continuous stirring and reflux cooling to complete monomer consumption (identified by a decrease in temperature of the reaction mixture). Next, 77.97 l of a 1.4 M sec-butyllithium (BuLi 2) solution was added, as the second initiator mixture (Ini 2), together with 13.48 l of a potassium tert-amyl alcoholate (PTA) solution (5.26 wt.-% in cyclohexane) as randomizer under continuous stirring.

In a next step, again 1756 l styrene (S2) was added and the polymerization reaction, under continuous stirring, was allowed to run to complete monomer consumption (identified by a decrease in temperature of the reaction mixture). After complete monomer consumption, the polymerization mixture was cooled by means of reflux cooling to a temperature below 75° C.

Then, 858 l butadiene (B1) and 573 l styrene (S3) were added simultaneously and the polymerization reaction, with continuous stirring, was allowed to run to complete monomer consumption (identified by a decrease in temperature of the reaction mixture). After complete monomer consumption, the polymerization mixture was cooled by means of reflux cooling to a temperature below 60° C.

In a next step, again 2290 l butadiene (B2) and 754 l styrene (S4) were added simultaneously and the polymerization reaction, with continuous stirring, was allowed to run to complete monomer consumption (identified by a decrease in temperature of the reaction mixture). After complete monomer consumption, the polymerization mixture was cooled by means of reflux cooling to a temperature below 90° C.

Then, again 214 l styrene (S5) was added and the polymerization reaction, with continuous stirring, was allowed to run to complete monomer consumption (identified by a decrease in temperature of the reaction mixture).

Finally, 10 minutes after the last complete monomer consumption, 17.2 l Efka® PL 5382 (epoxidized soya bean oil, BASF), heated to a temperature of 85° C., as coupling agent was added to the polymer solution and allowed to react for 10 minutes at a temperature of 90° C. while stirring.

Table 1 shows the amounts of the components used.

| Components | Wt.-% (phm) | kg | liter |
|---|---|---|---|
| Styrene I | 34.00% | 2551 | 2803 |
| Styrene II | 21.30% | 1598 | 1756 |
| Styrene III | 6.95% | 521 | 573 |
| Butadiene 1 | 7.08% | 531 | 857 |
| Styrene IV | 9.15% | 687 | 754 |
| Butadiene II | 18.92% | 1420 | 2290 |
| Styrene V | 2.60% | 195 | 214 |
| Edenol D82 | | 17.1 | 17.2 | phm=per hundred parts by weight of monomer (wt.-% of component (initiator, coupling agent etc.) is calculated on the total mass of the monomers.

The polymer solution obtained in step (i) was processed according to the following process flow:

BATCH REACTOR (step (i))→FILTER (step (ii)) →BUFFER VESSEL 1 (step (iii))→CARTRIDGE FILTER-→IMPREGNATION (step (iv) continuous) [INJECTION OF WATER, CO$_2$ and STABILIZERS→STATIC MIXER→INJECTION OF MINERAL OIL→STATIC MIXER] →BUFFER VESSEL 2→DEVOLATIZER→DEGASSING EXTRUDER→PELLETIZER.

Before emptying the batch reactor with the polymer solution obtained in step (i), ~3 l of water (20 l/h during 9 min) were added to the filter used in step (ii). One reactor volume was from 31 to 34 m$^3$.

The filter used in step (ii) was a MAXILINE MBF of HAYWARD Filter Technik—type: MBF-0802-AB16-150DS-11GEN-M:
  Innerdiameter filter: 778 mm
  Filterbags: 8×diameter 168 mm, Height 660 mm, mesh size 800 µm
  Flow rate when emptying the reactor: at least 102 m$^3$/h (1 pump)
  Flow rate over filter bag area: at least 0.01 m/s up to 0.02 m/s
  Temperature polymer solution: ~85° C.

Then, the polymer solution obtained in step (ii) was fed to a first buffer vessel (100 m$^3$).

Prior to step (iv), the polymer solution continuously withdrawn from the first buffer vessel was filtered through a cartridge filter. The filter used was G78W84HCB from CUNO MICRO-KLEAN with a mesh size of 125 µm. The filter material is consisting of acryl fiber and phenol resin and has a length of 100 cm.

Then, the polymer solution from the buffer vessel in step (iii) of the process, which prior to step (iv) was filtered through a cartridge filter, was impregnated (step (iv) of the inventive process) under the following conditions (continuous process):
  Continuous Flow of the polymer solution: 9 to 15 m$^3$/h;
  Temperature of the polymer solution: 70 to 80° C.;
  Injection flow water=0.11 l/m$^3$ polymer solution;
  Injection flow CO$_2$=16.35 l/m$^3$ polymer solution;
  Pressure in carbon dioxide feeding tube: 16 to 22 bar;
  Injection flow stabilizers=4.07 l/m$^3$ polymer solution;
  Injection flow mineral oil=3.12 l/m$^3$ polymer solution;
  all tubing is DN80, except tubing for CO$_2$ injection (=DN 50).

As stabilizers Irganox® 1010 (BASF SE, Germany), Irgaphos® 168 (BASF SE) and Sumilizer® GS (Sumitomo Corp., Japan) were used as a solution in cyclohexane in the following concentrations: Irganox® 1010 (7 wt.-%), Irgaphos® 168 (10 wt.-%) and Sumilizer® GS (7 wt.-%).

As mineral oil WINOG® 70 (medical white oil, H&R (Klaus Dahleke KG)) was used. As static mixer (step (iv)) a Sulzer mixer of the type SMX® with 2 SMX mixing elements arranged in series had been used. Each mixing element had a length of 840 mm and a tube diameter of 80 mm. Before entering the first SMX mixing element water, carbon dioxide and all stabilizers (in solution) were injected to the polymer solution, then before entering of the second SMX mixing element white oil was injected. Then, the polymer solution obtained in step (iv) was fed to a second buffer vessel. At last, after feeding the continuously withdrawn polymer solution from the second buffer vessel to a degassing device for degassing, the obtained polymer was fed into a twin-screw extruder for degassing extrusion under vacuum and under water pelletization. The obtained block copolymer had a Melt Flow Index (MFI, determined according to ISO 1133-1-2011 at 200° C. and a load of 5 kg) of 13.5 cm$^3$/10 min.

Example 2

Step (i) of the process according to Example 1 was repeated. The polymer solution obtained in step (i) was processed according to the process flow as shown for example 1 above.

Before emptying the batch reactor with the polymer solution obtained in step (i), ~2.7 l of water (20 l/h during 8.1 min) were added to the filter used in step (ii). One reactor volume was from 31 to 34 m$^3$.

The filter used in step (ii) was a MAXILINE MBF of HAYWARD Filter Technik—type: MBF-0802-AB16-150DS-11GEN-M:
  Inner diameter filter: 778 mm
  Filterbags: 8×diameter 168 mm, Height 660 mm, mesh size 800 µm
  Flow rate when emptying the reactor: 182.7 m$^3$/h
  Flow rate over filter bag area: 0.018 m/s
  Temperature polymer solution: ~89.3° C.

Then, the polymer solution obtained in step (ii) was fed to a first buffer vessel (100 m$^3$).

Prior to step (iv), the polymer solution continuously withdrawn from the first buffer vessel was filtered through a cartridge filter. The filter used was G78W84HCB from CUNO MICRO-KLEAN with a mesh size of 125 µm. The filter material is consisting of acryl fiber and phenol resin and has a length of 100 cm.

Then, the polymer solution from the buffer vessel in step (iii) of the inventive process, which prior to step (iv) was filtered through a cartridge filter, was impregnated (step (iv) of the inventive process) under the following conditions (continuous process):
  Continuous Flow of the polymer solution: 15 m$^3$/h;
  Temperature of the polymer solution: 70 to 80° C.;
  Injection flow water=0.18 l/m$^3$ polymer solution;
  Injection flow CO$_2$=16.32 l/m$^3$ polymer solution;

Pressure in carbon dioxide feeding tube: 16 to 22 bar;
Injection flow stabilizers=4.07 l/m$^3$ polymer solution;
Injection flow mineral oil=3.12 l/m$^3$ polymer solution;
all tubing is DN80, except tubing for CO$_2$ injection (=DN 50).

The used water in the above processes is demineralized water with an pH of 6.5.

As stabilizers Irganox® 1010 (BASF SE, Germany), Irgaphos® 168 (BASF SE) and Sumilizer® GS (Sumitomo Corp., Japan) were used as a solution in cyclohexane in the following concentrations: Irganox® 1010 (7 wt.-%), Irgaphos® 168 (10 wt.-%) and Sumilizer® GS (7 wt.-%). As mineral oil WINOG® 70 (medical white oil, H&R (Klaus Dahleke KG)) was used.

As static mixer (step (iv)) a Sulzer mixer of the type SMX® with 2 SMX mixing elements arranged in series had been used. Each mixing element had a length of 840 mm and a tube diameter of 80 mm. Before entering the first SMX mixing element water, carbon dioxide and all stabilizers (in solution) were injected to the polymer solution, then before entering of the second SMX mixing element white oil was injected. Then, the polymer solution obtained in step (iv) was fed to a second buffer vessel. At last, after feeding the continuously withdrawn polymer solution from the second buffer vessel to a degassing device for degassing, the obtained polymer was fed into a twin-screw extruder for degassing extrusion under vacuum and under water pelletization. The obtained block copolymer had a Melt Flow Index (MFI, determined according to ISO 1133-1-2011 at 200° C. and a load of 5 kg) of 13.5 cm$^3$/10 min.

Comparative Example 1

Example 1 was repeated, except that no water was added on the filter according to step (ii). The water was added only in the impregnation step (iv). 2 hours after production, samples (injection molded plates, thickness 4 mm) of the obtained SBC-polymer pellets of Example 1, Example 2 and Comparative Example 1 were used for color measurements (see Table 2) according to DIN 5033 and DIN 6174 (CIE LAB). For the measurements a LUCI 100 spectrophotometer (light source: Xenon lamp D65, D65=T=6504 K, measurement geometry: D/8°) has been used. YI=Yellowness index

TABLE 2

|  | Example 1 | Example 2 | Comparative Example 1 |
|---|---|---|---|
| YI | 7.82 | 6.3 | 9.66 |
| L-value | 92.55 | 94.67 | 93.97 |
| a-value | −0.03 | −0.21 | 0.04 |
| b-value | 4.03 | 3.37 | 5.06 |

Samples according to Example 1 and Example 2 have a better color stability (the higher the b-value and the higher the YI, the more yellow) than those of comparative example 1. The results clearly show that the addition of water on the filter in step (ii) is beneficial.

The invention claimed is:

1. A process for the preparation of homo- or block copolymers of vinyl aromatic monomers by anionic polymerization comprising the following steps:
   (i) polymerization of at least one vinyl aromatic monomer and optionally at least one conjugated diene in an inert non-polar solvent in the presence of an organometal initiator in a reactor, and subsequent deactivation of the obtained "living" polymer chains with a terminating agent to obtain a polymer solution;
   (ii) feeding the polymer solution obtained in step (i) to a dispersing device to which water is added in a continuous or in a discontinuous mode;
   (iii) feeding the polymer solution obtained in step (ii) to a buffer vessel; and
   (iv) feeding the continuously withdrawn polymer solution from the buffer vessel of step (iii) into a static mixer for impregnation by addition of further water, carbon dioxide, and one or more stabilizers;
wherein:
   subsequent to step (iii), the process is conducted in a continuous mode;
   in step (ii):
      the dispersion device is a filter having a mesh size of 200 to 1500 µm, a static mixer, or a process flow part in which the characteristic length of the process flow part, the velocity, the density, and the dynamic viscosity of the polymer solution are chosen in such a way that a transitional or turbulent flow characterized by a Reynolds number above 2300 occurs;
      the flow rate of the polymer solution is 10 to 500 m$^3$/h at a temperature of from 50 to 130° C.; and
      the water is added in amounts of 0.01 to 0.50 l/m$^3$ polymer solution;
   in step (iv):
      the flow rate of the water is more than 0.05 l/m$^3$ polymer solution, and
      the flow rate of the carbon dioxide is more than 5 l/m$^3$ polymer solution; and
   in steps (ii) and (iv), the pH of the water is in the range of from 5 to 7.

2. The process according to claim 1, wherein the reactor is a batch reactor.

3. The process according to claim 1, wherein in step (ii), the dispersing device is a filter.

4. The process according to claim 1, wherein in step (ii), the filter is a bag-filter.

5. The process according to claim 1, wherein in step (ii), the mesh size of the filter is 500 to 1000 µm.

6. The process according to claim 1, wherein in step (ii), the process flow part is a tube or pipe.

7. The process according to claim 1, wherein in step (ii), the water is added in amounts of 0.05 to 0.20 l/m$^3$ polymer solution.

8. The process according to claim 1, wherein the polymer solution obtained in step (iv) is fed to a further buffer vessel.

9. The process according to claim 1, wherein prior to step (iv), the polymer solution continuously withdrawn from the buffer vessel is filtered by an additional filter.

10. The process according to claim 9, wherein the additional filter is a cartridge filter with a mesh size between 50 µm and 300 µm.

11. The process according to claim 1, wherein in step (iv), the stabilizers are added as a solution with a flow rate of 1 to 8 l/m$^3$ polymer solution.

12. The process according to claim 1, wherein in step (iv) the stabilizers are dissolved in a nonpolar solvent where the concentration of each of the one or more stabilizers is in the range of from 3.5 to 15 wt.-%.

13. The process according to claim 1, wherein in step (iv), a plasticizer is added with an injection flow of 0.1 to 30 l/m$^3$ polymer solution.

* * * * *